United States Patent
Shi

(10) Patent No.: US 12,082,057 B2
(45) Date of Patent: Sep. 3, 2024

(54) USER EQUIPMENT AND METHOD FOR DUAL CONNECTIVITY OPERATION DURING WIRELESS COMMUNICATION HANDOVER OF SAME

(71) Applicant: GUANGDONG OPPO MOBILE TELECOMMUNICATIONS CORP., LTD., Dongguan (CN)

(72) Inventor: Yongsheng Shi, Palo Alto, CA (US)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 428 days.

(21) Appl. No.: 17/399,926

(22) Filed: Aug. 11, 2021

(65) Prior Publication Data

US 2021/0377824 A1    Dec. 2, 2021

Related U.S. Application Data

(63) Continuation of application No. PCT/CN2019/130591, filed on Dec. 31, 2019.
(Continued)

(51) Int. Cl.
*H04W 36/00* (2009.01)
*H04W 76/16* (2018.01)

(52) U.S. Cl.
CPC ... *H04W 36/0069* (2018.08); *H04W 36/0022* (2013.01); *H04W 36/0058* (2018.08); *H04W 76/16* (2018.02)

(58) Field of Classification Search
CPC .......... H04W 76/16; H04W 36/0072; H04W 36/0058; H04W 36/0022; H04W 56/001;
(Continued)

(56) References Cited

U.S. PATENT DOCUMENTS

2016/0014656 A1   1/2016  Stanze et al.
2020/0128453 A1*  4/2020  Teyeb ............... H04W 36/0069
(Continued)

FOREIGN PATENT DOCUMENTS

CN        103636256 A     3/2014
CN        109600770 A     4/2019
(Continued)

OTHER PUBLICATIONS

First Office Action from corresponding Chinese Application No. 2021109324275, dated Nov. 22, 2022. English translation attached.
(Continued)

*Primary Examiner* — Chi Ho A Lee

(74) *Attorney, Agent, or Firm* — Sheppard, Mullin, Richter & Hampton LLP

(57) ABSTRACT

A user equipment (UE) and a method for dual connectivity operation during wireless communication handover of same are provided. The method includes using a synchronization signal/physical broadcast channel (SS/PBCH) block measurement time configuration (SMTC) for one of a new radio (NR) primary secondary sell (PScell) addition procedure and a secondary node (SN) change procedure if the UE is configured with the SMTC in a NR measurement configuration and using one of a source long term evolution (LTE) primary cell (PCell) and a target LTE PCell as a timing reference if the UE is not configured with the SMTC in the NR measurement configuration.

20 Claims, 2 Drawing Sheets

Related U.S. Application Data

(60) Provisional application No. 62/824,732, filed on Mar. 27, 2019.

(58) Field of Classification Search
CPC .. H04W 88/06; H04W 36/0069; H04L 5/005; H04L 5/001; H04L 5/0053; H04L 5/0098
See application file for complete search history.

(56) References Cited

U.S. PATENT DOCUMENTS

| | | | | |
|---|---|---|---|---|
| 2020/0252822 | A1* | 8/2020 | Kim | H04W 76/15 |
| 2020/0404602 | A1* | 12/2020 | Ma | H04W 36/0061 |
| 2021/0014751 | A1* | 1/2021 | Callender | H04W 72/0446 |
| 2021/0219164 | A1* | 7/2021 | Zheng | H04L 5/0048 |
| 2021/0337455 | A1* | 10/2021 | Zhou | H04W 56/001 |
| 2021/0385765 | A1* | 12/2021 | Cheng | H04W 24/08 |
| 2022/0078737 | A1* | 3/2022 | Takeda | H04W 56/0045 |
| 2022/0132348 | A1* | 4/2022 | Orsino | H04W 76/28 |
| 2022/0132607 | A1* | 4/2022 | Yilmaz | H04W 68/02 |
| 2022/0141904 | A1* | 5/2022 | Yilmaz | H04W 76/16 370/329 |

FOREIGN PATENT DOCUMENTS

| | | |
|---|---|---|
| CN | 110100492 A | 8/2019 |
| CN | 110268736 A | 9/2019 |
| WO | 2012151746 A1 | 11/2012 |
| WO | 2012160048 A1 | 11/2012 |
| WO | 2018174782 A1 | 9/2018 |
| WO | 2019013564 A1 | 1/2019 |

OTHER PUBLICATIONS

Qualcomm Incorporated, "3GPP TSG RAN WG Meeting #103 R2-1811079, CR to 36.331 on missing SSB measurement information for blind NR PSCell addition and LTE-NR redirection (Q238,Q239)" public date Aug. 10, 2018.

Google Inc., "Cleanup on handover to EUTRA procedure", 3GPP TSG-RAN2 Meeting #103bis, R2-1814251,Sep. 28, 2018 (Sep. 28, 2018), 19 pages.

International Search Report and Written Opinion date Mar. 27, 2020 in International Application No. PCT/CN2019/130591.

Examination Report dated May 20, 2022 received in European Patent Application No. EP 19921813.2.

Extended European Search Report dated Dec. 9, 2021 received in European Patent Application No. EP 19921813.2.

Mediatek Inc: "Discussion on timing reference cell in SMTC configuration",3GPP Draft; R2-1902707 Timing Reference Cell in SMTC Configuration , 3rd Generation Partnership Project (3GPP) , Mobile Competence Centre ; 650 , Route Des Lucioles ; F-06921 Sophia-Antipolis Cedex ; FRA, vol. RAN WG2 , No. Athens , Greece; Feb. 25, 2019-Mar. 1, 2019 , Mar. 1, 2019 (Mar. 1, 2019) , XP051603910, 5 pages.

Qualcomm Incorporated : "Handling of SMTC configuration", 3GPP Draft; R2-1903752 , 3rd Generation Partnership Project (3GPP) , Mobile Competence Centre ; 650 , Route Des Lucioles ; F-06921 Sophia-Antipolis Cedex ; France , vol. RAN WG2 , No. Xian , China; Apr. 8, 2019-Apr. 12, 2019, Mar. 29, 2019 (Mar. 29, 2019) , XP051693013, 4 pages.

Huawei et al: "Inapplicability of SMTC in MeasObjectNR upon handover", 3GPP Draft; R2-1814138 , 3rd Generation Partnership Project (3GPP) , Mobile Competence Centre ; 650 , Route Des Lucioles ; F-06921 Sophia-Antipolis Cedex ; France , vol. RAN WG2 , No. Chengdu , China; Oct. 8, 2018-Oct. 12, 2018 Sep. 28, 2018 (Sep. 28, 2018) , XP051523597, 2 pages.

Ntt Docomo et al: "Remaining issues on NR PSCell addition delay", 3GPP Draft; R4-1900807 Remaining Issues on NR PSCell Addition R3 , 3rd Generation Partnership Project (3GPP) , Mobile Competence Centre ; 650 , Route Des Lucioles ; F-06921 Sophia-Antipolis Cedex ; Franc, vol. RAN WG4 , No. Athens , GR; Feb. 25, 2019-Mar. 1, 2019 Feb. 15, 2019 (Feb. 15, 2019) , XP051605516, 2 pages.

ZTE Corporation et al: "SMTC configuration in asynchronous networks", 3GPP Draft; R2-1802022 SMTC Configuration in Asynchronous Networks , 3rd Generation Partnership Project (3GPP) , Mobile Competence Centre ; 650 , Route Des Lucioles ; F-06921 Sophia-Antipolis Cedex ; FRA vol. RAN WG2 , No. Athens , Greece; Feb. 26, 2018-Mar. 2, 2018, Feb. 15, 2018 (Feb. 15, 2018) , XP051399792, 6 pages.

* cited by examiner

USER EQUIPMENT AND METHOD FOR DUAL CONNECTIVITY OPERATION DURING WIRELESS COMMUNICATION HANDOVER OF SAME

CROSS-REFERENCE TO RELATED APPLICATIONS

This application is a continuation of International Application No. PCT/CN2019/130591, filed Dec. 31, 2019, which claims priority to U.S. Provisional Patent Application No. 62/824,732, filed Mar. 27, 2019, both of which are hereby incorporated by reference in their entireties.

TECHNICAL FIELD

The present disclosure relates to the field of communication systems, and more particularly, to a user equipment (UE) and a method for dual connectivity operation during wireless communication handover of same.

BACKGROUND

The term EN-DC (evolved-universal terrestrial radio access-new radio) refers to E-UTRA NR dual connectivity. This feature allows mobile device to exchange data between itself and NR base station along with simultaneous connection with LTE base station. This is possible when there is tight interworking between long term evolution (LTE) and 5G NR base station has been established.

Therefore, there is a need for a user equipment (UE) and a method for dual connectivity operation during wireless communication handover of same.

SUMMARY

An object of the present disclosure is to propose a user equipment (UE) and a method for dual connectivity operation during wireless communication handover of same capable of providing high reliability.

In a first aspect of the present disclosure, a user equipment (UE) for dual connectivity operation during wireless communication handover includes a memory, a transceiver, and a processor coupled to the memory and the transceiver. The processor is configured to use a synchronization signal/ physical broadcast channel (SS/PBCH) block measurement time configuration (SMTC) for one of a new radio (NR) primary secondary sell (PScell) addition procedure and a secondary node (SN) change procedure if the processor is configured with the SMTC in a NR measurement configuration. The processor is configured to use one of a source long term evolution (LTE) primary cell (PCell) and a target LTE PCell as a timing reference if the processor is not configured with the SMTC in the NR measurement configuration.

In a second aspect of the present disclosure, a method for dual connectivity operation during wireless communication handover of a user equipment (UE) includes using a synchronization signal/physical broadcast channel (SS/PBCH) block measurement time configuration (SMTC) for one of a new radio (NR) primary secondary sell (PScell) addition procedure and a secondary node (SN) change procedure if the UE is configured with the SMTC in a NR measurement configuration and using one of a source long term evolution (LTE) primary cell (PCell) and a target LTE PCell as a timing reference if the UE is not configured with the SMTC in the NR measurement configuration.

In a third aspect of the present disclosure, a non-transitory machine-readable storage medium has stored thereon instructions that, when executed by a computer, cause the computer to perform the above method.

In a fourth aspect of the present disclosure, a terminal device includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
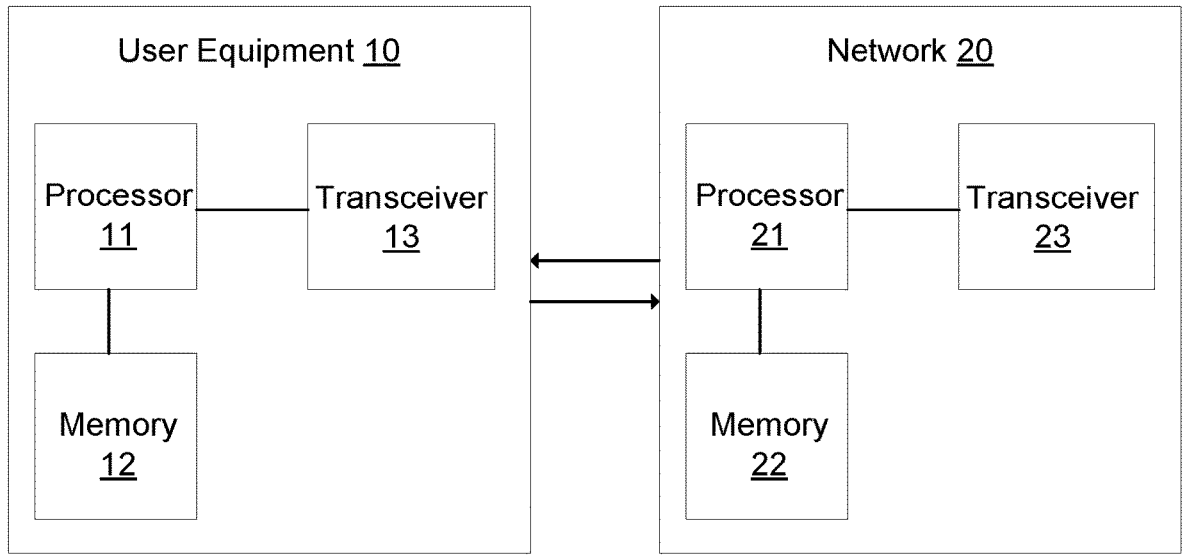
FIG. 1 is a block diagram of a user equipment and a network for dual connectivity operation during wireless communication handover according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In some embodiments, in a release 15 5G NSA EN-DC deployment, a long term evolution (LTE) eNB is a master node and a new radio (NR) gNB is secondary node. It is possible that a network to trigger the following mobility scenarios. Case 1: LTE only modes to EN-DC with LTE handover and NR addition. Case 2: EN-DC to EN-DC with both LTE handover and NR handover.

In some embodiments, 5G EN-DC has been introduced in 3GPP release 15. The term EN-DC (evolved-universal terrestrial radio access-new radio) refers to E-UTRA NR dual connectivity. This feature allows mobile device to exchange data between itself and NR base station along with simultaneous connection with LTE base station. This is possible when there is tight interworking between LTE and 5G NR base station has been established.

In this dual connectivity mode, UE may be simultaneously connected to LTE and NR or to LTE for control plane and NR for user plane. In this dual connectivity feature, UE leverages benefits of both LTE and 5G connectivity simultaneously.

In a new radio (NR) mobility procedure, a network could optionally provide a synchronization signal/physical broadcast channel (SS/PBCH) block measurement time configuration (SMTC) configuration and a user equipment (UE) could use this information to find a target cell. The SMTC configuration is based a system frame number (SFN) and a timing offset of a reference cell. Therefore, a radio resource control (RRC) specification needs to clearly define which timing reference cell to use.

In above cases, the embodiment denotes an LTE PCell at eNB1 as a source LTE cell and an LTE PCell at an eNB2 as a target LTE cell. When a new NR cell is added in handover, i.e. NR PScell in gNB in case 1 and NR PScell in gNB 2 in case 2, it is important to the UE to understand timing of this new NR cell for quick cell addition/change. In 5G specification, the timing is given by a SMTC. SMTC signaling is illustrated as a table 1.

TABLE 1

```
SSB-MTC ::=           SEQUENCE {
    periodicityAndOffset   CHOICE {
        sf5                INTEGER (0..4),
        sf10               INTEGER (0..9),
        sf20               INTEGER (0..19),
        sf40               INTEGER (0..39),
        sf80               INTEGER (0..79),
        sf160              INTEGER (0..159)
    },
    duration               ENUMERATED { sf1, sf2, sf3, sf4, sf5 }
}
```

Other than SMTC, the UE also needs to know the timing reference of this SMTC to correctly find the reference signal of the new NR PScell.

When the network triggers handover in case 1 and case 2, SMTC requirement is illustrated in a table 2.

TABLE 2

| smtc |
|------|
| The SSB periodicity/offset/duration configuration of target cell for NR PSCell addition and SN change. It is based on timing reference of EUTRAN PCell. If the field is absent, the UE uses the SMTC configured in the measObjectNR having the same SSB frequency and subcarrier spacing. |

By reading the requirements, there two observations in the embodiment.

If SMTC is given in a handover message, the UE is required to use LTE PCell as a timing reference cell. There are two opinions, source (i.e. eNB 1) LTE PCell can be used. A target (i.e. eNB 2) LTE PCell can be used. If the source LTE PCell is used, the UE knows the timing reference before a handover. Thus, NR PScell can be quickly found and added. However, target node (i.e. eNB 2) may not know source LTE PCell's timing. Since handover message is generated by the target node, it may not be possible to use source PCell as reference. In that sense, using target PCell's timing seems a clear choice although it may slow down NR PScell addition/change.

If SMTC is not given in the handover message, the UE is required to use SMTC in the previously configured NR measurement object The UE can use SMTC from previously configure NR measurement for NR PScell addition/change. However, the UE is only allowed to use the SMTC from measurement if the handover message does not include an SMTC. Since target eNB has no knowledge whether source eNB has configured the NR measurement, it would always include SMTC in handover message. This behavior effectively prevents the UE from using SMTC from NR measurement.

In some embodiments, there in a need to provide a solution to handle the follow case. Allow the UE to use SMTC in previously NR measurement configuration for quick NR PScell addition/change. If the UE is not configured with NR measurement, the UE can use target LTE PCell as timing reference.

FIG. 1 illustrates that, in some embodiments, a user equipment (UE) 10 and a network 20 for dual connectivity operation during wireless communication handover according to an embodiment of the present disclosure are provided. The UE 10 may include a processor 11, a memory 12, and a transceiver 13. The network 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, 16, and beyond. UEs communicate with each other directly via a sidelink interface such as a PC5 interface.

In some embodiments, the processor 11 is configured to use a synchronization signal/physical broadcast channel (SS/PBCH) block measurement time configuration (SMTC) for one of a new radio (NR) primary secondary sell (PScell) addition procedure and a secondary node (SN) change procedure if the processor 11 is configured with the SMTC in a NR measurement configuration. The processor 11 is configured to use one of a source long term evolution (LTE) primary cell (PCell) and a target LTE PCell as a timing reference if the processor 11 is not configured with the SMTC in the NR measurement configuration.

In some embodiments, the processor 11 is configured to use the SMTC for one of the NR PScell addition procedure and the SN change procedure, regardless if the SMTC is given in a handover message, if the processor 11 is configured with the SMTC in the NR measurement configuration.

In some embodiments, the processor 11 is configured to use the SMTC for the NR PScell addition procedure and the SN change procedure, regardless if the SMTC is given in a handover message, if the processor 11 is configured with the SMTC in the NR measurement configuration.

In some embodiments, the SMTC is provided in an LTE radio resource control (RRC) message.

In some embodiments, the target LTE PCell is used as the timing reference. The timing reference cell is a target evolved universal terrestrial radio access network (EUTRAN) PCell.

In some embodiments, the source LTE PCell is used as the timing reference. The timing reference cell is a source EUTRAN PCell.

In some embodiments, the PSCell addition procedure or the SN change procedure is triggered by a network together with an LTE handover procedure.

Figure 2:
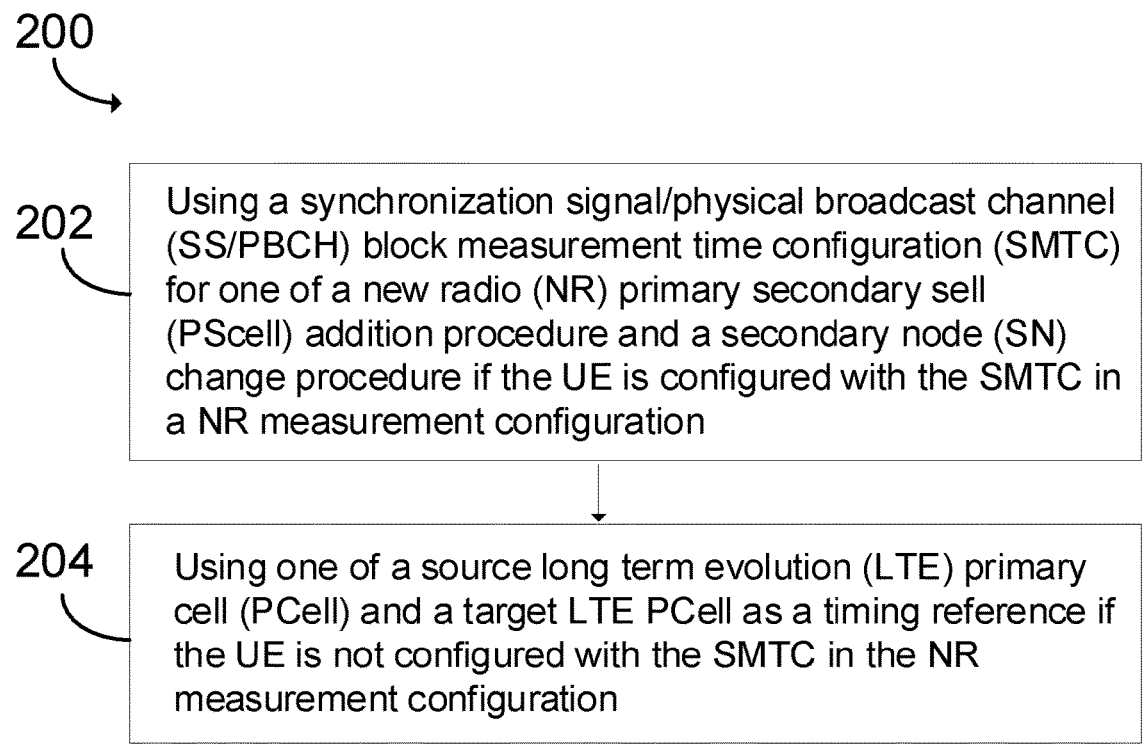
FIG. 2 is a flowchart illustrating a method for dual connectivity operation during wireless communication handover of a user equipment according to an embodiment of the present disclosure.

FIG. 2 illustrates a method 200 for dual connectivity operation during wireless communication handover of a user equipment according to an embodiment of the present disclosure. The method 200 includes: at block 202, using a synchronization signal/physical broadcast channel (SS/PBCH) block measurement time configuration (SMTC) for one of a new radio (NR) primary secondary sell (PScell) addition procedure and a secondary node (SN) change procedure if the UE is configured with the SMTC in a NR measurement configuration, and at block 204, using one of a source long term evolution (LTE) primary cell (PCell) and a target LTE PCell as a timing reference if the UE is not configured with the SMTC in the NR measurement configuration.

In some embodiments, the method 200 further includes using the SMTC for one of the NR PScell addition procedure and the SN change procedure, regardless if the SMTC is given in a handover message, if the UE 10 is configured with the SMTC in the NR measurement configuration.

In some embodiments, the method 200 further includes using the SMTC for the NR PScell addition procedure and the SN change procedure, regardless if the SMTC is given in a handover message, if the UE 10 is configured with the SMTC in the NR measurement configuration.

In some embodiments, the SMTC is provided in an LTE radio resource control (RRC) message.

In some embodiments, the target LTE PCell is used as the timing reference. The timing reference cell is a target evolved universal terrestrial radio access network (EUTRAN) PCell.

In some embodiments, the source LTE PCell is used as the timing reference. The timing reference cell is a source EUTRAN PCell.

In some embodiments, the PSCell addition procedure or the SN change procedure is triggered by a network together with an LTE handover procedure.

In summary, the embodiment changes UE behavior as follows.

If the UE is configured with SMTC in NR measurement configuration, the UE uses this SMTC for NR PScell addition/change, regardless if SMTC is given in handover message.

If the UE is not configured with SMTC in NR measurement configuration, the UE uses target LTE PCell as timing reference.

In some embodiments, the proposal itself explains the UE behavior clearly. Then, 3GPP 36.331 spec change would be proposed as a table 3.

TABLE 3

| smtc |
|---|
| The SSB periodicity/offset/duration configuration of target cell for NR PSCell addition and SN change. It is based on timing reference |

TABLE 3-continued

| smtc |
|---|
| of target EUTRAN PCell. The UE may not use it if the UE was configured with an SMTC in the measObjectNR having the same SSB frequency and subcarrier spacing. If the field is absent, the UE uses the SMTC configured in the measObjectNR having the same SSB frequency and subcarrier spacing. |

Figure 3:
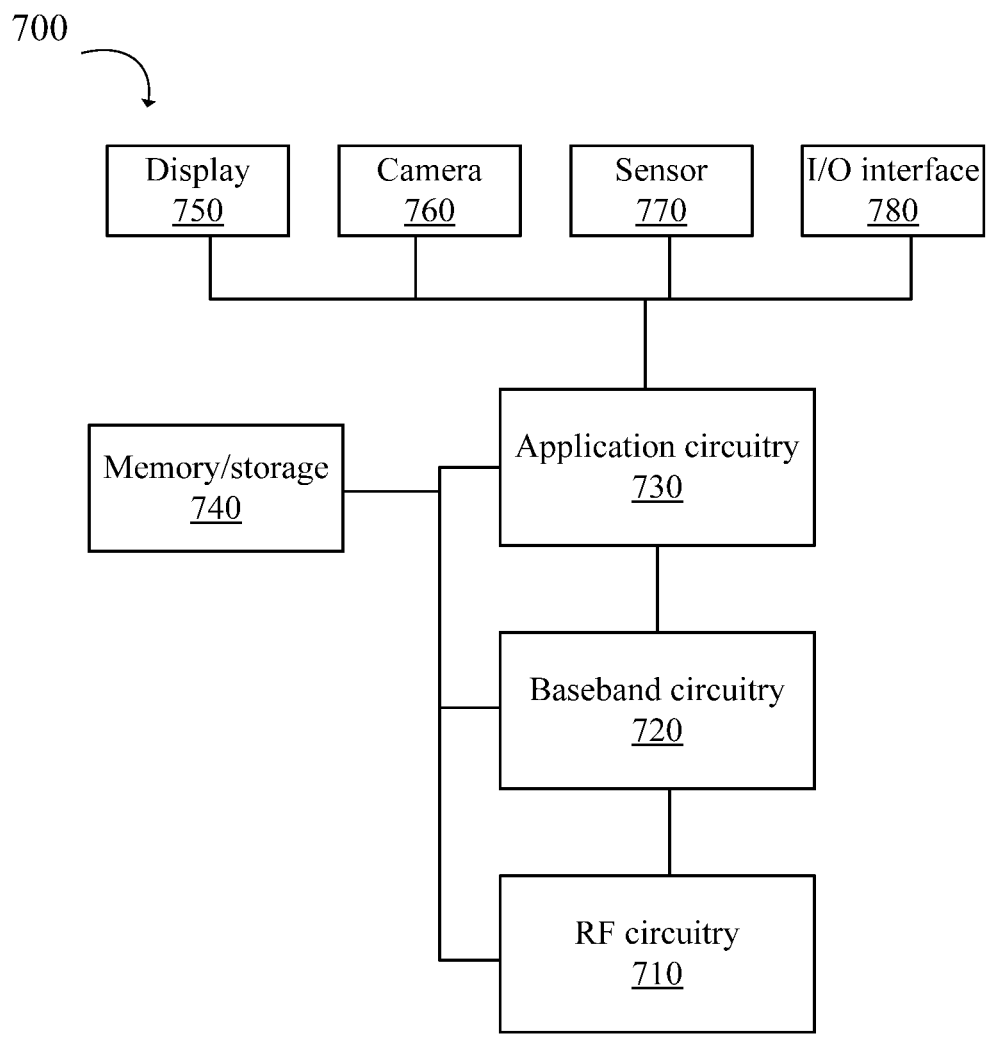
FIG. 3 is a block diagram of a system for wireless communication according to an embodiment of the present disclosure.

FIG. 3 is a block diagram of an example system 700 for wireless communication according to an embodiment of the present disclosure. Embodiments described herein may be implemented into the system using any suitably configured hardware and/or software. FIG. 3 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, a user equipment (UE) and a method for dual connectivity operation during wireless communication handover of same capable of providing high reliability are provided. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE) for dual connectivity operation during wireless communication handover, comprising:
   a memory;
   a transceiver; and
   a processor coupled to the memory and the transceiver, wherein the processor is configured to:
use a synchronization signal/physical broadcast channel block measurement time configuration (SMTC) for one of a new radio (NR) primary secondary sell (PScell) addition procedure and a secondary node (SN) change procedure if the processor is configured with the SMTC in a NR measurement configuration, regardless if another SMTC is given in a handover message; and
use one of a source long term evolution (LTE) primary cell (PCell) and a target LTE PCell as a timing reference if the processor is not configured with the SMTC in the NR measurement configuration,
wherein the SMTC is provided in an LTE radio resource control (RRC) message; and
wherein the target LTE PCell is used as the timing reference.

2. The UE of claim 1, wherein the timing reference cell is a target evolved universal terrestrial radio access network (EUTRAN) PCell.

3. The UE of claim 1, wherein the source LTE PCell is used as the timing reference.

4. The UE of claim 3, wherein the timing reference cell is a source EUTRAN PCell.

5. The UE of claim 1, wherein the PSCell addition procedure or the SN change procedure is triggered by a network together with an LTE handover procedure.

6. The UE of claim 1, wherein when the SMTC is given in the handover message, the SMTC is given in an SMTC field of the handover message.

7. The UE of claim 1, wherein when the processor is configured with the SMTC in the NR measurement configuration, the SMTC is given in a measObjectNR Information Element (IE).

8. The UE of claim 1, wherein the SMTC is used for one of the NR PScell addition procedure and the SN change procedure if the processor is configured with the SMTC in the NR measurement configuration by giving the SMTC in a measObjectNR IE, regardless if the other SMTC is given in an SMTC field of the handover message.

9. The UE of claim 1, wherein the SMTC is based on a system frame number (SFN) and a timing offset of a reference cell.

10. A method for dual connectivity operation during wireless communication handover of a user equipment (UE), comprising:
using a synchronization signal/physical broadcast channel block measurement time configuration (SMTC) for one of a new radio (NR) primary secondary sell (PScell) addition procedure and a secondary node (SN) change procedure if the UE is configured with the SMTC in a NR measurement configuration, regardless if another SMTC is given in a handover message; and
using one of a source long term evolution (LTE) primary cell (PCell) and a target LTE PCell as a timing reference if the UE is not configured with the SMTC in the NR measurement configuration,
wherein the SMTC is provided in an LTE radio resource control (RRC) message; and
wherein the target LTE PCell is used as the timing reference.

11. The method of claim 10, wherein the timing reference cell is a target evolved universal terrestrial radio access network (EUTRAN) PCell.

12. The method of claim 10, wherein the source LTE PCell is used as the timing reference.

13. The method of claim 10, wherein the timing reference cell is a source EUTRAN PCell.

14. The method of claim 10, wherein the PSCell addition procedure or the SN change procedure is triggered by a network together with an LTE handover procedure.

15. A non-transitory machine-readable storage medium having stored thereon instructions that, when executed by a computer, cause the computer to perform the method of claim 10.

16. A terminal device, comprising: a processor and a memory configured to store a computer program, the processor configured to execute the computer program stored in the memory to perform the method of claim 10.

17. The method of claim 10, wherein when the SMTC is given in the handover message, the SMTC is given in an SMTC field of the handover message.

18. The method of claim 10, wherein when the UE is configured with the SMTC in the NR measurement configuration, the SMTC is given in a measObjectNR Information Element (IE).

19. The method of claim 10, wherein the SMTC is used for one of the NR PScell addition procedure and the SN change procedure if the processor is configured with the SMTC in the NR measurement configuration by giving the SMTC in a measObjectNR IE, regardless if the other SMTC is given in an SMTC field of the handover message.

20. The method of claim 10, wherein the SMTC is based on a system frame number (SFN) and a timing offset of a reference cell.

* * * * *